United States Patent
Geva et al.

(10) Patent No.: US 10,572,613 B2
(45) Date of Patent: *Feb. 25, 2020

(54) ESTIMATING TIMING CONVERGENCE USING ASSERTION COMPARISONS

(71) Applicant: International Business Machines Corporation, Armonk, NY (US)

(72) Inventors: Ofer Geva, Ramat Hasaron (IL); Yaniv Maroz, Tel Aviv (IL); Limor Plotkin, Yehuda (IL); Shiran Raz, Ganey Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,516

(22) Filed: Oct. 31, 2017

(65) Prior Publication Data
US 2018/0341732 A1 Nov. 29, 2018

Related U.S. Application Data

(63) Continuation of application No. 15/604,694, filed on May 25, 2017, now Pat. No. 10,325,045.

(51) Int. Cl.
*G06F 17/50* (2006.01)

(52) U.S. Cl.
CPC ...... *G06F 17/5031* (2013.01); *G06F 17/5054* (2013.01)

(58) Field of Classification Search
CPC combination set(s) only.
See application file for complete search history.

(56) References Cited

U.S. PATENT DOCUMENTS

| | | | |
|---|---|---|---|
| 6,952,816 B2 | 10/2005 | Gupta | |
| 7,243,323 B2 | 7/2007 | Williams | |
| 7,805,697 B2 | 9/2010 | Wood | |
| 7,853,912 B2 | 12/2010 | Binder et al. | |
| 9,332,793 B2 | 5/2016 | Heffington | |
| 9,342,639 B1 | 5/2016 | Casey et al. | |
| 9,418,198 B1 | 8/2016 | Daellenbach et al. | |
| 2003/0051222 A1* | 3/2003 | Williams | ............ G06F 17/5031 716/113 |
| 2004/0006584 A1 | 1/2004 | Vandeweerd | |

(Continued)

OTHER PUBLICATIONS

Danese et al. "Automatic Generation and Qualification of Assertions on Control Signals: A Time Window-Based Approach-Springer" Nov. 22, 2016. pp. 1-5.

(Continued)

*Primary Examiner* — Stacy Whitmore
(74) *Attorney, Agent, or Firm* — Edward P. Li

(57) ABSTRACT

A computer system for estimating timing convergence using assertion comparisons. The computer system receives predefined golden assertions associated with a macro to be tested. The computer system executes the macro to obtain current feedback assertion values. The computer system calculates one or more metrics based on a comparison between the current feedback assertion values and values of one or more different sets of assertions. The computer system estimates a time to convergence based on the one or more calculated metrics. The computer system generates a schedule based on the estimated time to convergence.

16 Claims, 6 Drawing Sheets

(56) References Cited

U.S. PATENT DOCUMENTS

| | | |
|---|---|---|
| 2004/0068711 A1 | 4/2004 | Gupta |
| 2008/0307374 A1 | 12/2008 | Gregerson |
| 2009/0119630 A1* | 5/2009 | Binder ................ G06F 17/5031 716/113 |
| 2014/0089880 A1 | 3/2014 | Haller |
| 2014/0165022 A1 | 6/2014 | Stevens |
| 2014/0336931 A1 | 11/2014 | Wilkins |
| 2016/0314236 A1 | 10/2016 | Bhanji |
| 2017/0247028 A1 | 8/2017 | Goudy |
| 2017/0284816 A1 | 10/2017 | Greenspan |
| 2018/0341731 A1 | 11/2018 | Geva |

OTHER PUBLICATIONS

Sheridan et al. "A Coverage Guided Mining Approach for Automatic Generation of Succinct Assertions" 2014 27th International Conference on VLSI Design and 2014 13th International Conference on Embedded Systems. pp. 68-73.

Appendix P List of IBM Patents or Applications Treated as Related. Dated Oct. 31, 2017. Two pages.

Geva et al. Original U.S. Appl. No. 15/604,694, filed May 25, 2017.

* cited by examiner

FIG. 4A (400A)

| 402 | 404 | 406 | 408 | 410 | 412 |
|---|---|---|---|---|---|
| 3.0 | feedback | pin_in_1 | (golden) 115 115 32 33 | (feedback) 113 112 42 42 | (don't take golden) |
| 13.0 | feedback | pin_in_2 | (golden) 199 201 28 30 | (feedback) 186 187 28 30 | (don't take golden) |
| 34.0 | feedback | pin_in_3 | (golden) 104 111 21 21 | (feedback) 70 70 21 21 | (don't take golden) |
| -7.0 | diff>delta | pin_in_4 | (golden) 73 79 9 9 | (feedback) 80 80 40 40 | (take golden) |

FIG. 4B (400B)

| 402 | 404 | 406 | 408 | 410 | 412 |
|---|---|---|---|---|---|
| -7.0 | feedback | pin_out_1 | (golden) 90 87 | (feedback) 97 93 | (don't take golden) |
| -12.0 | feedback | pin_out_2 | (golden) 79 76 | (feedback) 91 87 | (don't take golden) |
| -7.0 | feedback | pin_out_3 | (golden) 90 86 | (feedback) 97 93 | (don't take golden) |
| 6.0 | diff>delta | pin_out_4 | (golden) 155 151 | (feedback) 149 148 | (take golden) |

ESTIMATING TIMING CONVERGENCE USING ASSERTION COMPARISONS

BACKGROUND

The present invention relates generally to timing convergence, and more particularly to estimating timing convergence using assertion comparisons.

The structure and behavior of electronic circuits and digital logic circuits can be described using a hardware description language (HDL). HDLs enable precise, formal descriptions of electronic circuits that allow for automated analysis and simulation. For example, the electronic circuits may include complex circuits such as application-specific integrated circuits (ASICs), microprocessors, and programmable logic devices (PLDs). HDLs may be used to express the structure of electronic systems and their behavior over time. HDLs thus also include an explicit notion of time, which may be a primary attribute of hardware. For example, the Very High Speed Integrated Circuit (VHSIC) Hardware Description Language (VHDL) is an HDL used in electronic design automation to describe digital and mixed-signal systems such as field-programmable gate arrays and integrated circuits. A macro written in VHDL may include multiple design abstractions organized as a hierarchy. Macros may be also referred herein as cells or blocks. In some examples, a macro can be a synthesizable register-transfer level (RTL) or manually designed. For example, a macro may be any cell that can be placed and routed in a placement and routing tool. A macro can be editable and can contain standard cells or any other sub macros. In some examples, a macro can be optimized for power, area, or timing. In some examples, the inputs for a macro can include feedback assertions, size of the macro, RTL, clock placement, among other inputs. For example, a higher level of a hierarchy may be a register-transfer level (RTL). An RTL can be used to model a synchronous digital circuit in terms of the flow of digital signals (data) between hardware registers, and the logical operations performed on those signals. In some examples, lower-level representations and ultimately actual wiring can be derived from higher level representations.

Feedback assertions can be included in synthesized macros in order to analyze timing in the macros. During a project lifetime, the values of feedback assertions given to synthesizable blocks may tend to change and thus be unstable. This instability may be particularly prevalent in early stages of project development until timing converges. As used herein, convergence refers to a state wherein timing feedback assertions of a macro may fluctuate within a window or threshold difference of time. Moreover, instability at higher levels of a design hierarchy may result in even greater instability at lower levels of the hierarchy. For example, fluctuations of timing at the flow of a digital signal level may translate to even greater fluctuations at the lower-level representations due to additional delays caused by wiring, etc. Thus, the timing of higher level representations is generally stabilized before additional parameters of a project, such as power, size, space, etc., can then be analyzed and modified accordingly. However, it is difficult to determine how close to timing convergence a project may be by looking at the values of feedback assertions. Thus, efficiently scheduling tasks that depend on convergence may also be very difficult.

SUMMARY

According to an embodiment described herein, a computer system comprises one or more processors, one or more computer readable tangible storage devices, and program instructions stored on at least one of the one or more computer readable tangible storage devices for execution by at least one of the one or more processors. The program instructions are executable to execute a macro to obtain current feedback assertion values. The program instructions are executable to calculate one or more metrics based on a comparison between current feedback assertion values and values of one or more different sets of assertions. The program instructions are executable to estimate a time to convergence based on the one or more metrics. The program instructions are executable to generate a schedule based on the time to convergence.

According to another embodiment described herein, a computer program product for estimating timing convergence can include a computer-readable storage medium having program code embodied therewith. The program code is executable by a processor to cause the processor to execute the macro to obtain current feedback assertion values. The program code is executable by a processor to cause the processor to calculate one or more metrics based on a comparison between current feedback assertion values and values of one or more different sets of assertions. The program code is executable by a processor to cause the processor to estimate a time to convergence based on the one or more metrics. The program code is executable by a processor to cause the processor to generate a schedule based on the time to convergence.

BRIEF DESCRIPTION OF THE SEVERAL VIEWS OF THE DRAWINGS

FIG. 4A and FIG. 4B are example output files including golden assertion and feedback assertion values, in accordance with one embodiment of the present invention.

DETAILED DESCRIPTION

According to embodiments of the present invention, a processor may estimate timing convergence using assertion comparisons. For example, the processor can receive predefined golden assertions associated with a macro to be tested. The processor may execute the macro to obtain current feedback assertion values. For example, the assertion values may be timing delays or advance timings measured in picoseconds or using any other suitable time frame. The processor may also calculate one or more metrics based on a comparison between current feedback assertion values and values of one or more different sets of assertions. The processor may further estimate a time to convergence based on the one or more calculated metrics. The processor may then generate a schedule based on the estimated time to convergence. Thus, the present invention enable the estimation of timing convergence. The present invention may be able to estimate or predict a timing convergence for a particular project and generate a schedule accordingly. For example, once a macro has stable timings from feedback assertions, then other parameters of the project may be worked on. Thus, the present invention may enable more efficient design process for electronic circuits. Moreover, the present invention enable automated selection of golden assertions from a set of received golden assertions. For example, golden assertions can be automatically selected based on calculated delta timings between golden assertions and feedback assertions.

Figure 1:
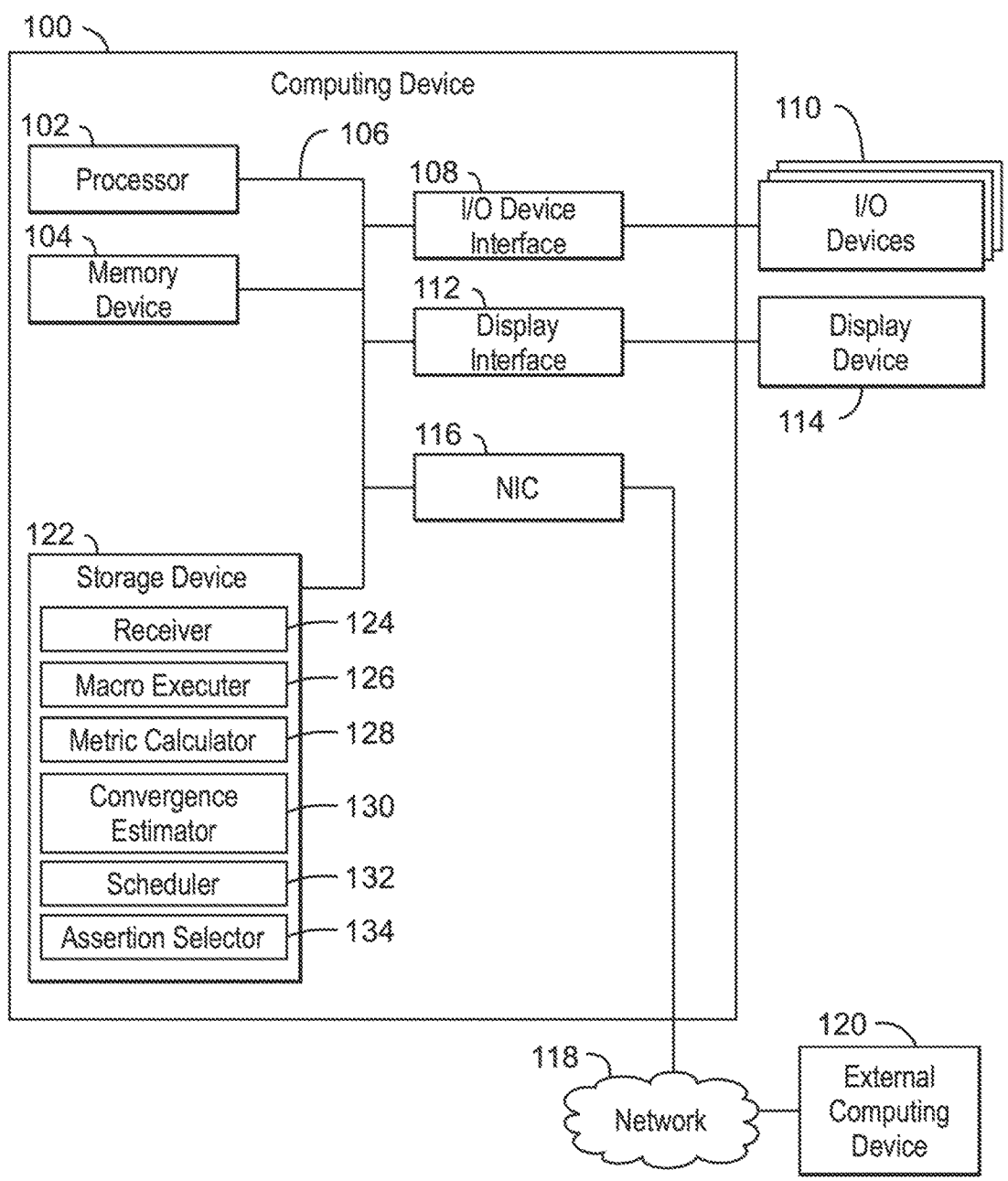
FIG. 1 is a block diagram of an example computing device that can estimate timing convergence using assertion comparisons, in accordance with one embodiment of the present invention

With reference now to FIG. 1, an example computing device can estimate timing convergence using assertion comparisons. Computing device 100 may be, for example, a server, a network device, a desktop computer, a laptop computer, a tablet computer, or a smartphone. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

Computing device 100 may include processor 102 that is to execute stored instructions, memory device 104 to provide temporary memory space for operations of the instructions during operation. Processor 100 can be a single-core processor, a multi-core processor, a computing cluster, or any number of other configurations. Memory 104 can include random access memory (RAM), read only memory, flash memory, or any other suitable memory systems.

Processor 102 may be connected through system interconnect 106 (e.g., PCI®, PCI-Express®, etc.) to input/output (I/O) device interface 108 adapted to connect computing device 100 to one or more I/O devices 110. I/O devices 110 may include, for example, a keyboard and a pointing device, wherein the pointing device may include a touchpad or a touchscreen, among others. I/O devices 110 may be built-in components of computing device 100, or may be devices that are externally connected to computing device 100.

Processor 102 may also be linked through system interconnect 106 to display interface 112 adapted to connect computing device 100 to display device 114. Display device 114 may include a display screen that is a built-in component of computing device 100. Display device 114 may also include a computer monitor, television, or projector, among others, that is externally connected to computing device 100. In addition, network interface controller (NIC) 116 may be adapted to connect computing device 100 through system interconnect 106 to network 118. In some embodiments, NIC 116 can transmit data using any suitable interface or protocol, such as the internet small computer system interface, among others. Network 118 may be a cellular network, a radio network, a wide area network (WAN), a local area network (LAN), or the Internet, among others. External computing device 120 may connect to computing device 100 through network 118.

Processor 102 may also be linked through system interconnect 106 to storage device 122 that can include a hard drive, an optical drive, a USB flash drive, an array of drives, or any combinations thereof. In some examples, storage device 122 may include receiver module 124, macro executer module 126, metric calculator module 128, convergence estimator module 130, scheduler module 132, and assertion selector module 134. In some examples, one or more of modules 124-136 may be implemented in an application or a web browser plugin. Receiver module 124 can receive predefined golden assertions associated with a macro to be tested. Golden assertions, as used herein, refer to a set of assertions that may represent ideal timings. For example, a golden assertion may be a timing that only takes into account certain delay factors such as logic cell delay and wire delay. Macro executer module 126 can then execute the macro to obtain current feedback assertion values. Metric calculator module 128 can calculate one or more metrics based on a comparison between current feedback assertion values and values of one or more different sets of assertions. For example, metric calculator module 128 can calculate an assertion stability metric based on a sum of pin changes between the current feedback assertion values and previous feedback assertion values. In some examples, metric calculator module 128 can calculate a convergence metric based on a comparison between current feedback assertion values and the predefined golden assertions. Convergence estimator module 130 can estimate a time to convergence based on the one or more calculated metrics. Scheduler module 132 can generate a schedule based on the estimated time to convergence. Assertion selector module 134 can select a feedback assertion from a set of received candidate feedback assertions to insert into the macro for a second execution based on the calculated one or more metrics. In some examples, assertion selector module 134 can generate an output file comprising a recommendation to input a golden assertion to the macro design based on a predefined user rule. For example, a predefined user rule may be any suitable process or tool for determining whether to input a golden assertion into a macro design. In some examples, assertion selector module 134 can update the predefined golden assertions for each logic update using a zero while load timing based on logic cell delay and wire delay. In some examples, assertion selector module 134 can identify an unrealistic assertion based on the one or more calculated metrics. For example, an unrealistic assertion may be an assertion that contains values that are far from an expected value. For example, a higher hierarchy may give a non-optimal solution that causes the feedback assertions to be far from a predetermined range of expected values. In some examples, assertion selector module 134 can automatically select assertions to pick up based on a threshold convergence metrics. In some examples, the threshold may be initially based on historical values of previous projects and decrease over time based on calculated convergence metrics. For example, the threshold may be decreased as a project progresses until the threshold is no longer used because convergence has been achieved.

It is to be understood that the block diagram of FIG. 1 is not intended to indicate that computing device 100 is to include all of the components shown in FIG. 1. Rather, computing device 100 can include fewer or additional components not illustrated in FIG. 1 (e.g., additional memory components, embedded controllers, modules, additional network interfaces, etc.). Furthermore, any of the functionalities of receiver module 124, macro executer module 126, metric calculator module 128, convergence estimator module 130, scheduler module 132, and assertion selector module 134, may be partially, or entirely, implemented in hardware and/or in processor 102. For example, the functionality may be implemented with an application specific integrated circuit, logic implemented in an embedded controller, or in logic implemented in processor 102, among others. In some embodiments, the functionalities of receiver module 124, macro executer module 126, metric calculator module 128, convergence estimator module 130, scheduler module 132, and assertion selector module 134, can be implemented with logic, wherein the logic, as referred to herein, can include any suitable hardware (e.g., a processor, among others), software (e.g., an application, among others), firmware, or any suitable combination of hardware, software, and firmware.

Figure 2:
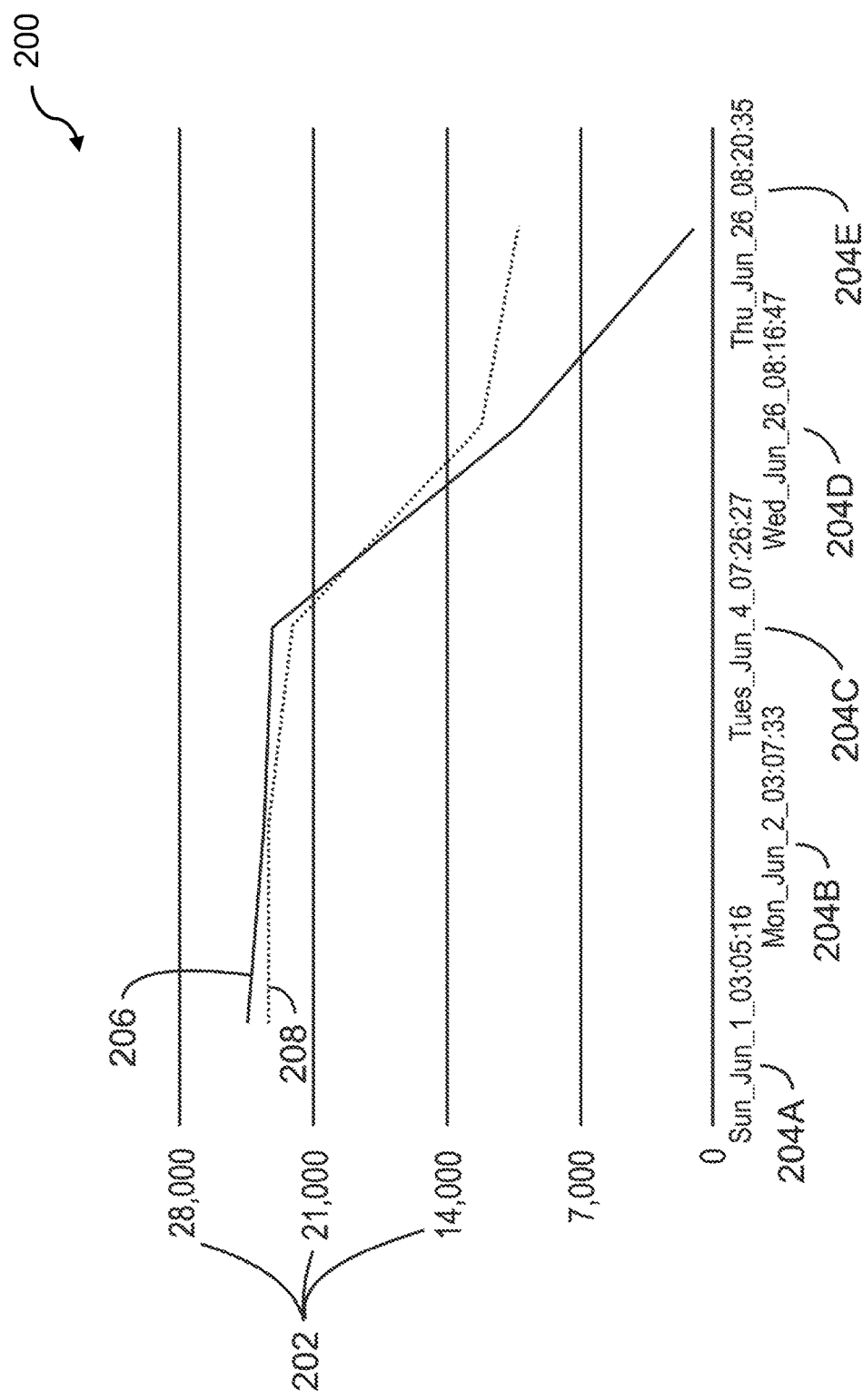
FIG. 2 is a graph depicting a sum of pin changes of an example macro over a period of a week, in accordance with one embodiment of the present invention.

FIG. 2 is a graph depicting a sum of pin changes of an example macro over a period of a week, in accordance with one embodiment of the present invention. The graph is generally referenced using reference number 200. In some examples, the sum of pin changes may also be referred to as an assertion stability metric.

In the example of FIG. 2, graph 200 includes a first axis depicting sums of pin changes (SOC) 202 and a second axis depicting time, including times 204A, 204B, 204C, 204D, and 204E. Graph 200 includes dashed line 206 depicting SOC at an input pin. Graph 200 also includes line 208 depicting SOC at an output pin.

In some examples, a feedback assertion of a current week can be compared to the previous week's assertion. The resulting values can be compared to see how much the feedback assertion values have changed. In some examples, the delta between the values can be measured in terms of SOCs. In some examples, the SOC can be expressed as a complete figure of merit (FOM). For example, the FOM may be a sum of all slacks for high level usage. In some examples, the SOC can be measured by net. At time 204A, 3:05:16 of Sunday June 1st, the input pin SOC (depicted by dashed line 206) has a value of 23335 picoseconds (ps), while the output pin SOC (depicted by line 208) has a value of 23404 ps. At time 304B, 3:07:33 on Monday June 2nd, the input pin SOC (depicted by dashed line 206) has a value of 23300 ps, while the output pin SOC (depicted by line 208) has a value of 23380 ps. At time 304C, 7:26:27 on Tuesday June 4th, the input pin SOC (depicted by dashed line 206) has a value of 23100 ps, while the output pin SOC (depicted by line 208) has a value of 23300 ps. At time 304D, 8:16:47 on Wednesday June 5th, the input pin SOC (depicted by dashed line 206) has a value of 12000 ps, while the output pin SOC (depicted by line 208) has a value of 10,500 ps. At time 304E, 8:20:35 on Thursday, June 6th, the input pin SOC (depicted by dashed line 206) has a value of 950 ps, while the output pin SOC (depicted by line 208) has a value of 10,500 ps.

In some examples, a threshold number may be predefined to determine whether a macro is stable. For example, an SOC below the threshold may indicate that a pin has reached a stable timing. In FIG. 2, for example, the input pin may be said to have reached stability on Thursday if the threshold level was set to 1000 ps because the value of 950 is below the 1000 ps threshold. In some examples, either one pin or a summarization of all the deltas between assertions may be used. For example, the deltas may be difference between the input pin measured over one week versus the input pin measured over a previous week. In either case, the result is one number for each point in time on graph 200. In some examples, the pins can be measured every week to see a trend. In some examples, the delta is an absolute value. For example, a change to an earlier or later timing may both be depicted as positive values in the graph.

Figure 3:
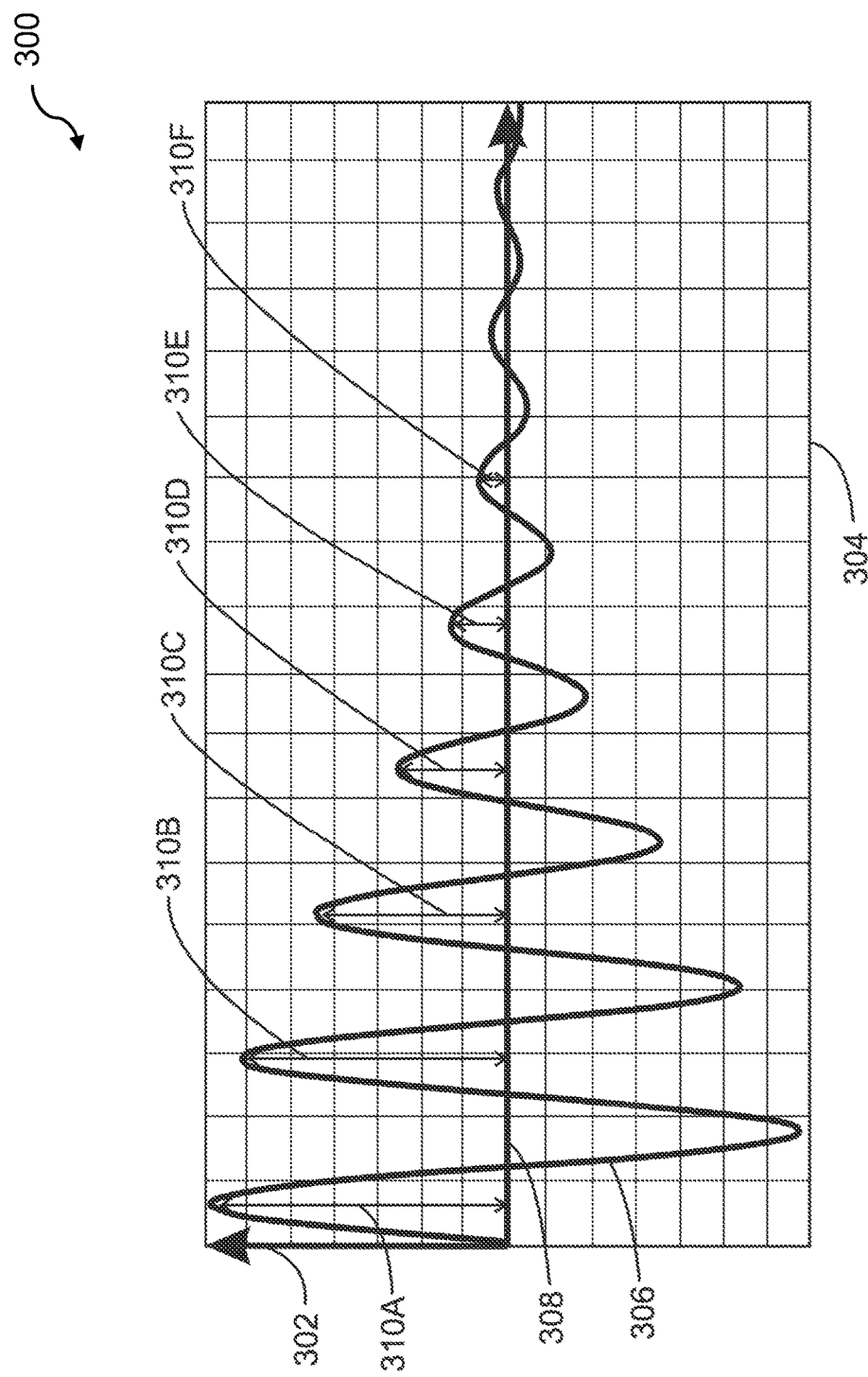
FIG. 3 is a graph depicting timing convergence of an example macro towards an example golden assertion, in accordance with one embodiment of the present invention.

FIG. 3 is a graph depicting timing convergence of an example macro towards an example golden assertion, in accordance with one embodiment of the present invention. The graph is generally referenced using reference number 300.

Graph 300 of FIG. 3 includes first axis 302 indicating feedback assertion values expressed as a difference from golden assertion values, and second axis 304 indicating time. Graph 300 includes values for a particular monitored feedback assertion 306. Feedback assertion 306 is shown fluctuating sinusoidally about golden assertion 308 that serves as a baseline set of timing values. For example, a preliminary set of golden assertions that may represent ideal case assertions. For example, a golden assertion may be an ideal timing for a macro. In some examples, golden assertion 308 may have different values; however they are represented as a straight baseline for purposes of graph 300. In some examples, golden assertion 308 may be predefined by a user or calculated using any suitable method. For example, a golden assertion may be calculated using a zero while load (ZWL) method. In this method, timing values for golden assertion 308 may be based on logic and wire delay. In some examples, golden assertion 308 can be any suitable process or output of any suitable tool.

As seen in graph 300, the series of local maximums or amplitudes 310A, 310B, 310C, 310D, 310E and 310F of feedback assertion 306 indicate diminishing divergences from golden assertion 308 over time. In some examples, these amplitudes may be used to measure how much feedback assertion 306 differs from golden assertion 308 over time. In the example of FIG. 3, feedback assertion 306 is shown converging over time towards golden assertion 308. In some examples, a threshold difference can be set to determine whether a feedback assertion has reached convergence. For example, if the threshold is set to the first line above and below golden assertion 308, then feedback assertion 306 can be detected as having reached convergence at the time of amplitude 310F. In some examples, the differences represented by amplitudes 310A-310F may be output in a file. For example, the output file may be similar to the example output files of FIG. 4A and FIG. 4B.

FIG. 4A and FIG. 4B are example output files including golden assertion and feedback assertion values, in accordance with one embodiment of the present invention. The output file in FIG. 4A is referenced generally using reference number 400A and the output file in FIG. 4B is referenced generally using reference number 400B.

In FIG. 4A, output file 400A is associated with input pins of a synthesized macro. The example output file 400A includes a set of timing deltas 402, a set of corresponding recommendations 404 of which assertions to use, a set of corresponding pin names 406, a set of corresponding golden assertion values 408, a set of corresponding feedback assertion values 410, and a set of corresponding customizable recommendations 412. For example, the golden assertion values may be golden assertion values as discussed above. In some examples, the customizable recommendations can be predefined by a user.

In example output file 400A, a user may have predefined customizable recommendations 412 based on any suitable rule for deciding which sets of assertions to use. For example, a rule may have been predefined that assertions resulting in a timing delta 402 less than zero are to be used. In the example of FIG. 4A, the assertion resulting in a value of −7.0 thus results in a recommendation 412 value of "take golden".

In FIG. 4B, output file 400B is associated with output pins of a synthesized macro. Example output file 400B also includes a set of timing deltas 402, a set of corresponding recommendations 404 of which assertions to use, a set of corresponding pin names 406, a set of corresponding golden assertion values 408, a set of corresponding feedback assertion values 410, and a set of corresponding customizable recommendations 412.

In example output file 400B, a rule may have predefined that assertions resulting in timing deltas 402 greater than zero are to be used. Thus, timing deltas 402 with negative values of −7.0, −12.0, and −7.0 result in a recommendation 412 value of "don't take golden" whereas timing delta 402 value of 6.0 results in a recommendation 412 value of "take golden".

It should be understood that the diagram of FIG. 4 is not intended to indicate that output files 400A and 400B are to include all of the components shown in FIG. 4A and FIG. 4B. Rather, output files 400A and 400B can include fewer or additional components not illustrated in FIG. 4A and FIG. 4B (e.g., additional recommendations, pins, values, etc.).

Figure 5:
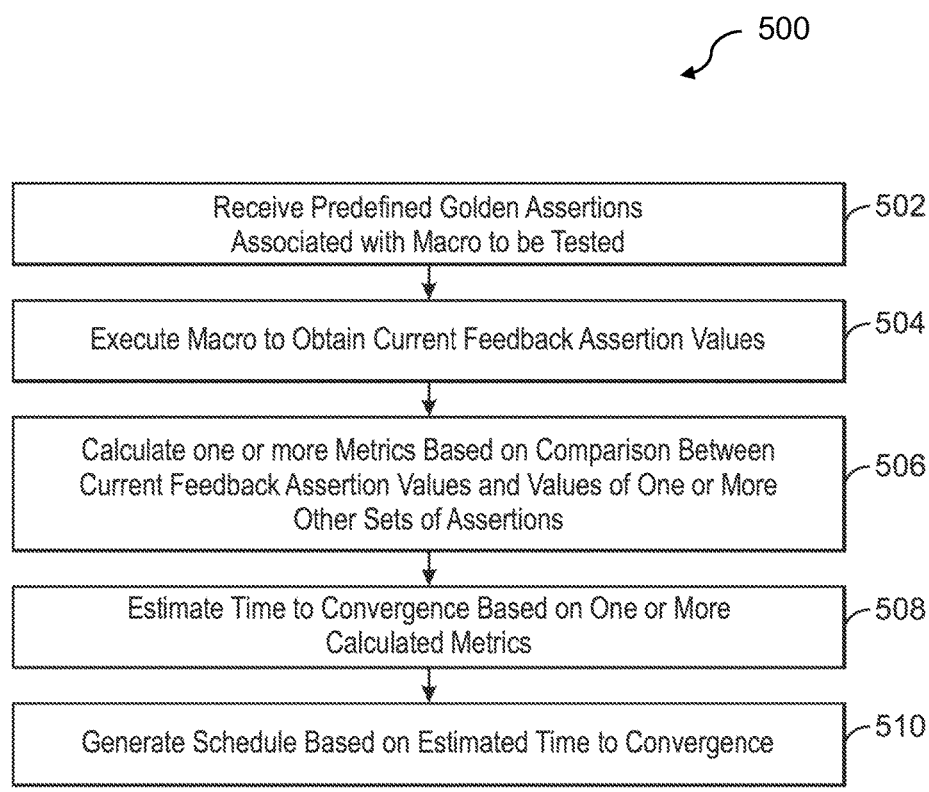
FIG. 5 is a process flow diagram of an example method for estimating timing convergence using assertion comparisons, in accordance with one embodiment of the present invention.

FIG. 5 is a process flow diagram of an example method for estimating timing convergence using assertion comparisons, in accordance with one embodiment of the present invention. Method 500 can be implemented with any suitable computing device, such as computing device 100 of FIG. 1. For example, the method can be implemented via processor 102 of computing device 100.

At step 502, the processor receives predefined golden assertions associated with a macro to be tested. For example, a macro can receive as input feedback assertions to be compared with the golden assertions, as well as size of the macro, RTL, clock placement, among other inputs. In some examples, the golden assertion may be a baseline set of assertions that can be used to compare with feedback assertions. For example, the predefined golden assertions may be golden assertions as discussed above. In some examples, the golden assertions may be based on logic cell delay and wire delay. For example, a zero while load process may be used to generate the golden assertions based on logic cell delay and wire delay.

At step 504, the processor executes the macro to obtain current feedback assertion values. For example, the values may indicate a timing delay or early timing in picoseconds, or any other suitable time frame, for each input and output pin in the macro.

At step 506, the processor calculates one or more metrics based on a comparison between current feedback assertion values and values of one or more different sets of assertions. In some examples, the processor can calculate an assertion stability metric based on a sum of pin changes between the current feedback assertion values and previous feedback assertion values. For example, the previous feedback assertion values may be values received after executing the macro a week earlier. A difference may be calculated between the current value of each pin and the previous value for each pin. The differences in the pin values may be summed to generate a sum of pin changes. In some examples, the processor can calculate a convergence metric based on comparison between current feedback assertion values and the predefined golden assertions. For example, the difference between a feedback assertion value and a golden assertion value for each pin may be calculated.

At step 508, the processor estimates a time to convergence based on the one or more calculated metrics. For example, the processor can estimate a time to convergence based on the convergence metric. In some examples, the processor can monitor a plurality of macros and estimate a convergence time for a chip or a project. In some examples, the processor can also identify an unrealistic assertion based on the one or more calculated metrics.

At step 510, the processor generates a schedule based on the estimated time to convergence. For example, tasks that depend on a stable timing may be scheduled after the estimated time of convergence. In some examples, the processor can also generate an output file comprising a recommendation to take a golden assertion based on a predefined user rule. For example, the output file may be the output file of FIG. 4A or 4B above. In some examples, the processor may compare the feedback assertions to golden assertions. For example, if the delta is higher than a predefined threshold delta, then the processor may recommend the user to use the golden assertions so the macro will use more realistic data. If not the delta is not higher than the predefined threshold delta, then the processor may not recommend to use the golden assertion.

The process flow diagram of FIG. 5 is not intended to indicate that the operations of method 500 are to be executed in any particular order, or that all of the operations of method 500 are to be included in every case. Additionally, method 500 can include any suitable number of additional operations. For example, the processor can also select a feedback assertion from a set of received candidate feedback assertions to insert into the macro for a second execution based on the calculated one or more metrics. In some examples, the processor can monitor a plurality of macros and estimate a convergence time for a chip or a project. In some examples, the output files may be used as input to generate a macro that is used to manufacture an integrated circuit or system on a chip with timings corresponding to the macro.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 6:
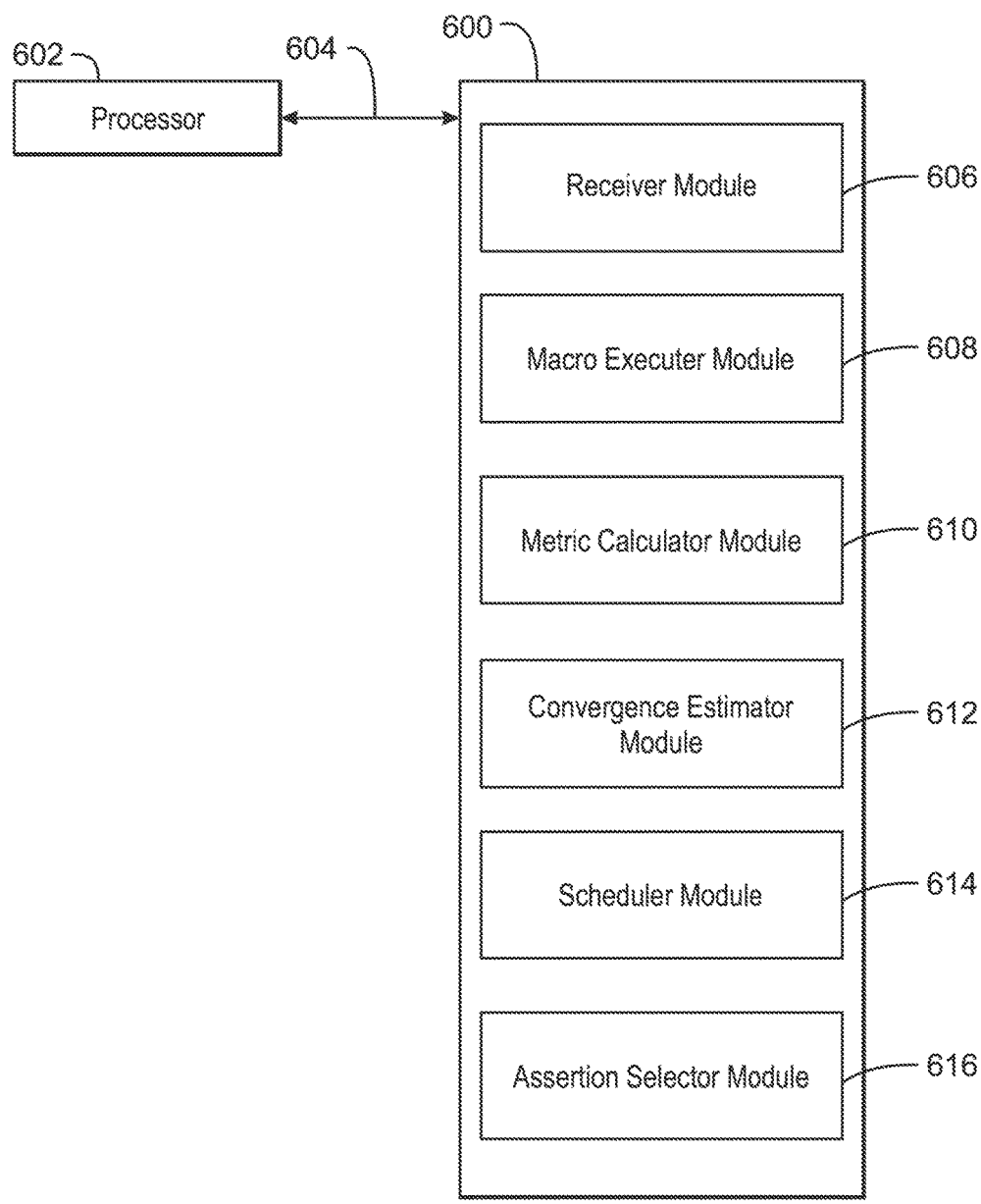
FIG. 6 is an example tangible, non-transitory computer-readable medium that can estimate timing convergence using assertion comparisons, in accordance with one embodiment of the present invention.

Referring now to FIG. 6, a block diagram is depicted of an example tangible, non-transitory computer-readable medium 600 that can estimate timing convergence using assertion comparisons. Tangible, non-transitory, computer-readable medium 600 may be accessed by processor 602 over computer interconnect 604. Furthermore, tangible, non-transitory, computer-readable medium 600 may include code to direct processor 602 to perform the operations of method 500 of FIG. 5 above.

The various software components discussed herein may be stored on tangible, non-transitory, computer-readable medium 600, as indicated in FIG. 6. For example, receiver module 606 includes code to receive predefined golden assertions associated with a macro to be tested. Macro executer module 608 includes code to execute the macro to obtain current feedback assertion values. Metric calculator module 610 includes code to calculate one or more metrics based on a comparison between current feedback assertion values and values of one or more different sets of assertions. For example, metric calculator module 610 may include code to calculate an assertion stability metric based on a sum of pin changes between the current feedback assertion values and previous feedback assertion values. In some examples, metric calculator module 610 may include code to calculate a convergence metric based on comparison between current feedback assertion values and the predefined golden assertions including the predefined golden assertions. Convergence estimator module 612 includes code to estimate a time to convergence based on the one or more calculated metrics. Scheduler module 614 includes code to generate a schedule based on the estimated time to convergence. Assertion selector module 616 includes code to select a feedback assertion from a set of received candidate feedback assertions to insert into the macro for a second execution based on the calculated one or more metrics. In some examples, assertion selector module 616 can include code to generate an output file comprising a recommendation to take a golden assertion based on a predefined user rule. In some examples, assertion selector module 616 can include code to update the predefined golden assertions for each logic update using a zero while load timing based on logic cell delay and wire delay. It is to be understood that any number of additional software components not shown in FIG. 6 may be included within tangible, non-transitory, computer-readable medium 600, depending on the particular application.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for estimating timing convergence in testing a macro for design of electronic circuits, the computer system comprising:
   one or more processors, one or more computer readable tangible storage devices, and program instructions stored on at least one of the one or more computer readable tangible storage devices for execution by at least one of the one or more processors, the program instructions executable to:
   execute the macro to obtain current feedback assertion values for each input pin and each output pin in the macro, wherein the macro is written in a hardware description language and includes multiple design abstractions;
   calculate one or more metrics based on a comparison between the current feedback assertion values and values of one or more different sets of assertions;
   calculate an assertion stability metric based on a sum of pin changes between the current feedback assertion values and previous feedback assertion values;
   estimate a time to convergence based on the one or more metrics including the assertion stability metric; and
   generate a schedule of one or more tasks that are worked on the macro, based on the time to convergence.

2. The computer system of claim 1, further comprising the program instructions executable to:
   calculate a convergence metric based on comparison between the current feedback assertion values and predefined golden assertions.

3. The computer system of claim 1, further comprising the program instructions executable to:
   receive predefined golden assertions associated with a macro to be tested and calculate a convergence metric based on comparison between the current feedback assertion values and the predefined golden assertions.

4. The computer system of claim 1, further comprising the program instructions executable to:
   select a feedback assertion from a set of received candidate feedback assertions to insert into the macro for a second execution based on the one or more metrics.

5. The computer system of claim 1, further comprising the program instructions executable to:
   generate an output file comprising a recommendation to input a golden assertion into a macro design based on a predefined user rule.

6. The computer system of claim 1, further comprising the program instructions executable to:
   update predefined golden assertions for each logic update using a zero while load timing based on logic cell delay and wire delay.

7. The computer system of claim 1, further comprising the program instructions executable to:
   identify an unrealistic assertion based on the one or more metrics.

8. The computer system of claim 1, further comprising the program instructions executable to:
   monitor a plurality of macros and estimating a convergence time for a chip or a project.

9. A computer program product for estimating timing convergence in testing a macro for design of electronic circuits, the computer program product comprising a computer-readable storage medium having program code embodied therewith, the program code executable by a processor to cause the processor to:
   execute the macro to obtain current feedback assertion values for each input pin and each output pin in the macro, wherein the macro is written in a hardware description language and includes multiple design abstractions;
   calculate one or more metrics based on a comparison between the current feedback assertion values and values of one or more different sets of assertions;
   calculate an assertion stability metric based on a sum of pin changes between the current feedback assertion values and previous feedback assertion values;
   estimate a time to convergence based on the one or more metrics including the assertion stability metric; and
   generate a schedule of one or more tasks that are worked on the macro, based on the time to convergence.

10. The computer program product of claim 9, further comprising program code executable by the processor to:
    calculate a convergence metric based on comparison between the current feedback assertion values and predefined golden assertions.

11. The computer program product of claim 9, further comprising program code executable by the processor to:
    receive predefined golden assertions associated with a macro to be tested and calculate a convergence metric based on comparison between the current feedback assertion values and the predefined golden assertions.

12. The computer program product of claim 9, further comprising program code executable by the processor to:
    select a feedback assertion from a set of received candidate feedback assertions to insert into the macro for a second execution based on the one or more metrics.

13. The computer program product of claim 9, further comprising program code executable by the processor to:
    generate an output file comprising a recommendation to input a golden assertion into a macro design based on a predefined user rule.

14. The computer program product of claim 9, further comprising program code executable by the processor to:
    update predefined golden assertions for each logic update using a zero while load timing based on logic cell delay and wire delay.

15. The computer program product of claim 9, further comprising program code executable by the processor to:
    identify an unrealistic assertion based on the one or more metrics.

16. The computer program product of claim 9, further comprising program code executable by the processor to:
    monitor a plurality of macros and estimating a convergence time for a chip or a project.

* * * * *